United States Patent [19]

Mundy

[11] 3,723,979

[45] Mar. 27, 1973

[54] ASSOCIATIVE MEMORY SYSTEM

[75] Inventor: Joseph L. Mundy, Schenectady, N.Y.

[73] Assignee: General Electric Company, Schenectady, N.Y.

[22] Filed: Nov. 1, 1971

[21] Appl. No.: 194,678

[52] U.S. Cl. .......340/173 AM, 340/172.5, 340/173 R

[51] Int. Cl. ..........................................G11c 15/00

[58] Field of Search ....................340/172.5, 173 AM

[56] References Cited

UNITED STATES PATENTS

| | | | |
|---|---|---|---|
| 3,402,394 | 9/1968 | Koerner | 340/173 AM |
| 3,648,254 | 3/1972 | Beausokil | 340/173 AM |

*Primary Examiner*—Terrell W. Fears
*Attorney*—John F. Ahern et al.

[57] ABSTRACT

An associative memory system is disclosed for grouping events in $n$ dimensional space wherein each event is represented by an $n$ bit word. As a specific example of the comparison and grouping capabilities of this associative memory system, an encoding and decoding system is disclosed wherein the separation of a plurality of messages can be made a maximum and the number of tolerable errors set to any desired value. Specifically, to decode, the output current, during an associative search of the memory, is proportional to the separation between the search message and the stored, error-free message. Adjustable threshold sensing of the output current enables one to select the maximum amount of tolerable error. To encode, an associative search is made for the coded version of a message utilizing the uncoded version of the message.

10 Claims, 11 Drawing Figures

ASSOCIATIVE MEMORY SYSTEM

This invention relates to an associative memory system, specifically an associative memory system capable of selectively analyzing and comparing quantities of information to enable partial grouping of such information in n-dimensional space.

In human intelligence, external events perceived by the five senses only have meaning when compared with past experience. Thus, incoming information is constantly being compared, or ignored, by the brain and the meaning of the information obtained. Further, the brain is adaptive, i.e., the incoming information adds to the experience and affects future comparisons.

Attempts to simulate the processing of the brain have resulted in "parallel" processing systems, as opposed to the "serial" processing systems of early computers. By "serial" processing is meant that each item of information is processed step by step to a terminal state. "-Parallel" processing is used to indicate that the information is dealt with as a whole in simultaneous fashion. An example of this is the use of two or more complete computer systems, working on a problem simultaneously to achieve lower processing time. This somewhat brute force approach has the obvious disadvantage of requiring a large amount of equipment. Also, the several computers must be interfaced so that the information contained on one is known by the others.

Associative memories, generally speaking, are parallel processing, comparison devices. In a serial type of computer, the information is stored by address and must be properly addressed to be found. Associative memories store and search information by the content of the information. There is no address per se. Hence these memories are also known as content addressed memories. While comparison devices are known in the prior art, these devices tend to be "rigid", i.e. sensitive to errors in the transmitted information. Further, the devices cannot be readily adapted to new classifications. Also, "look-up" tables are generally used which require a large memory capacity and consume a needless amount of time while the information is searched.

One area where this problem is apparent is in the encoding and decoding of digital messages. Prior to transmission of a message, for example containing alphabetical characters, each character is converted to a digital word of a suitable number of bits. The word is then searched in a look-up table (a memory and comparator) to find the coded version. The coded version is then transmitted. A coded version is used to provide error checking information at the receiving end.

At the receiving end, the coded version is decoded. This usually involves error correction logic, generally utilizing a shift register. The error correction logic puts the received message in proper form and the error free coded version is read out. After decoding, the word is then converted to an alphabetical character. All of this consumes a great deal of time and involves more steps than are really necessary.

In view of the foregoing, it is therefore an object of the present invention to provide a high speed comparison system utilizing an associative memory.

A further object of the present invention is to provide a high speed comparison system in which transmission errors need not be corrected.

Another object of the present invention is to provide an associative memory system for dividing information into characteristic groups.

A further object of the present invention is to provide an associative memory system for dividing information into characteristic groups in which some of the information is ignored.

Another object of the present invention is to provide an associative memory system in which information is divided into groups or regions in Hamming space by utilizing output signals from the memory indicative of separation in Hamming space.

A further object of the present invention is to provide an associative memory system tolerent of a predetermined, maximum number of errors in the incoming information.

The foregoing objects are achieved in the present invention wherein there is provided a matrix of associative memory cells capable of associative search and associative search with "mask." To categorize a given word of information, an associative search is made of templates representing groups or sub-groups of information. The output current from the memory cells comprising each word in the matrix indicates the separation between the given word and each word in the memory. Logic circuitry then chooses the word producing the lowest current, hence the closest group to which the word belongs.

Where the groups represented by the templates are words of a message, the amount of separation determines the maximum number of errors that can be tolerated. In a specific use of the present invention as an encoder/decoder, to encode, a search is made with the uncoded version of the word. In the memory, the bits corresponding to the coded version are masked. Monitoring the output currents of the memory will provide an indication of a match by virtue of a minimal current for a particular word. The entire word, corresponding to the coded version, is then read out.

To decode, an associative search is made of the entire word or code part in general. The uncoded portion of the word in the memory that most closely matches the entire word is then read out.

A more complete understanding of the present invention may be obtained by considering the following detailed description in conjunction with the accompanying drawings, in which:

FIG. 1 contains a two dimensional illustration of groups of events in *n* dimensional space.

If one considers the fundamental unit of information as an "event", i.e. the smallest unit into which information may be subdivided without losing collective meaning, then the concept of events can be applied to any type of information. Further, dividing an event produces "bits", which may be considered the presence or absence of certain characteristics. Collecting events into various groups and determining essential characteristics produces "concepts".

In order to process information electronically, the information is reduced to a pattern of ones and zeroes, each representing a distinct logic level. Individual ones and zeroes are "bits" and pattern groups of ones and zeroes are words. Thus, considering the preceding paragraph, bits represent bits and words represent events.

Figure 1:
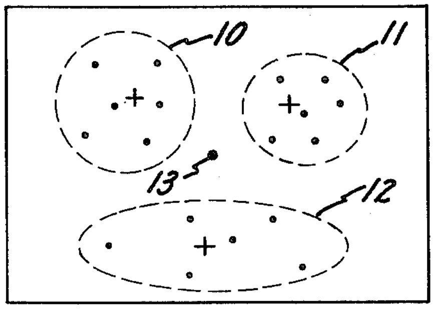

FIG. 1 illustrates three groups 10, 11, 12 each containing six events. The groups need not be circular, but are merely illustrated as such. If each event is represented by an $n$-bit word, where n is an integer, FIG. 1 then represents the projection in two dimensions of the $n$-dimensional space in which the events occur. Event 13 in FIG. 1 is not shown as a member of any group. The question then arises: How shall event 13 be classified? It is to be classified according to its relationship to the concepts of groups 10–12. The apparatus of the present invention provides a means whereby the concepts of groups 10–12 may be determined and the relationship of event 13 evaluated. As will be more fully described later, the apparatus of the present invention is also capable of determining that event 13 is not sufficiently related to groups 10–12 and therefore forms a fourth group containing, at present, a single member.

Figure 2:
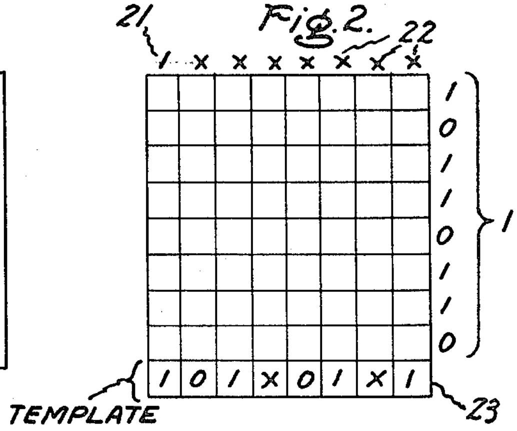
FIG. 2 illustrates a memory matrix used in making templates in accordance with the present invention.
Figure 3:
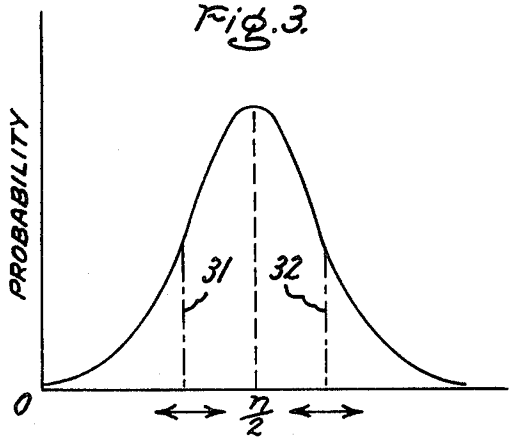
FIG. 3 illustrates a probability curve used in explaining the formation of templates.

In describing the determination of the classification of event 13, reference is also made to FIGS. 2 and 3. Prior to the determination of the relationship of event 13 to the concepts of groups 10–12, the concepts of these groups must be determined. In determining the concept of a group, an associative memory cell array or matrix as illustrated in FIG. 2 is utilized to fabricate a "-template" which represents the concept of the group.

Each "template" is formed by associatively searching arbitrary information in a matrix containing all the words of a group. In this operation, it is determined whether a particular bit in each word is typically a logic 1 or a logic 0. Each memory cell in the matrix typically contains access lines interconnected by one or more transistors, with one of the transistors storing the information in the cell. An associative search entails applying information in the form of a voltage level to one access line to the cell and seeing if that information has been coupled to an output access line. While various application and sense combinations are possible, typically a "match" is indicated by the absence of an output signal and a "mismatch" is indicated by the presence of an output signal. The output lines for each bit in a word are joined together so that a multi-level signal is obtained, depending upon the number of mismatches in the word.

FIG. 2 illustrates a matrix of associative memory cells containing rows of words and columns of bits. Assuming each event is described by an $n$-bit word and that there are $m$ events in a group, the matrix illustrated in FIG. 2 will contain $n$ columns and $m$ rows. Each event, for example in group 10, is stored as words in the matrix of FIG. 2 and an associative search is made of the memory cell one bit at a time to determine the logic level of each bit in the word. For example, the first bit in the words is compared to a logic one, designated by reference numeral 21, and the number of matches or mismatches is determined.

Whether the first bit is typically a logic one is determined in accordance with a probability curve as illustrated in FIG. 3. According to the probability curve illustrated in FIG. 3, if random information is stored as the first bit in all of the words in the matrix, then the most likely result is that there will be an approximately equal number of logic ones and logic zeroes. Thus, the probability curve as illustrated in FIG. 3 has a pronounced peak at the $n/2$ point, where $n$ is the number of bits being observed. In order to determine whether or not a particular bit is characteristically a logic one or a logic zero, threshold sensing is utilized. Thus, if the resultant number of matches falls below threshold level 31, then the first bit is characteristically a logic zero. Conversely, if the number of matches exceeds threshold 32, then the first bit is characteristically a logic one. The interval between threshold level 31 and 32 represents a "don't care" region in which it may be reasonably considered that the logic level of that particular bit does not materially contribute to the characteristics of the event. Threshold levels 31 and 32 may be adjusted as desired to any predetermined ratio of matches to mismatches. Obviously, it does not matter whether a logic one or a logic zero is used as the basis for comparison.

The remaining bits of information of the words representing the events in group 10 are masked as indicated by $x$'s 22 in FIG. 2 so that the information contained in these bits does not contribute to the matching operation. Each column is then separately compared with arbitrarily chosen input information in order to determine the characteristics of the events in group 10.

As an example of the result of these comparisons, FIG. 2 contains template 23 indicative of the concept of group 10. Thus, in the specific example of FIG. 2, each event is considered defined by an 8-bit word and, consequently, the concept of group 10, illustrated in FIG. 1 as a +, is defined by an 8-bit template. It should be noted that template 23 contains the "don't care" indication in the fourth and seventh bit locations. The concepts of groups 11 and 12 are similarly determined and stored in an associative memory. The characteristics of an associative memory suitable for implementing the present invention will be more fully described in connection with FIG. 5.

Figure 4:
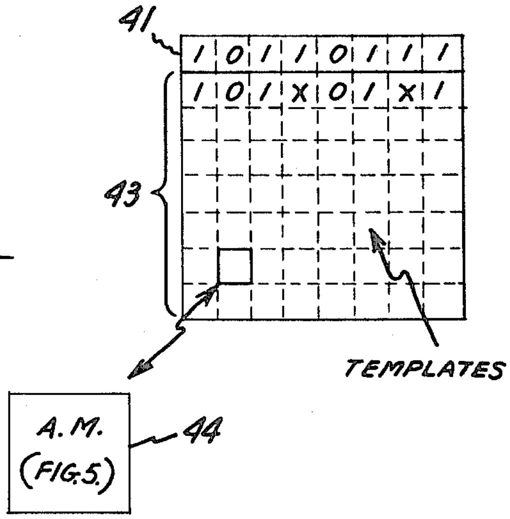
FIG. 4 illustrates a memory array containing a plurality of templates and having a message applied thereto.

After the templates for the different groups are obtained, they are stored in an associative memory matrix for use in the comparison operation to determine the classification of event 13. In order to do this, the word describing event 13 is read into the input storage portion of the associative memory matrix. This is illustrated in FIG. 4 and designated by reference numeral 41. The various other templates comprise the remainder of matrix 43 and are used in the comparison of the word describing event 13 with the concepts they represent. In order to determine the relationship of event 13 to groups 10–12, an associative search is made of matrix 43 for word stored in input storage 41. During the associative search the word most nearly like the word describing event 13 is indicated as the concept encompassing event 13. As illustrated in FIG. 4, the concept of group 10 encompasses event 13 since the bits defining event 13 match the template of group 10 virtually exactly. The fourth and seventh bits of the template for group 10 are in the "don't care" mode so that it does not matter what the fourth and seventh bits of the word defining event 13 are.

The use of the "don't care" mode serves the important and useful function of reducing to zero the base level of the mismatch indication. For example, in a 1,000 bit word where only 20 bits are of particular interest, if 3 bits can mismatch, then peripheral circuitry must be capable of distinguishing a 0, 1, 2 or 3 level from a 4 level. However, where 980 bits cannot be masked and are arbitrarily made all 1's, then, statistically, half will mismatch, on the average. Thus, the peripheral circuitry must distinguish a 490, 491, 492 or 493 level from a 494 level. Obviously, the percentage difference that must be detected is much smaller, requiring extremely complex sense apparatus.

In accordance with the present invention, it is not necessary to rely on the use of masked bits in order to determine the classification of event 13. The various groups 10–12 as illustrated in FIG. 1 are separated by a predetermined distance. Thus, the associative memory matrix of FIG. 4 can be utilized to classify event 13 even where there are bits that mismatch. The degree of mismatch determines the separation between the concept of group 10 and event 13. The amount of separation that can be tolerated is set to any desired value by the use of adjustable threshold sensing.

Figure 6:
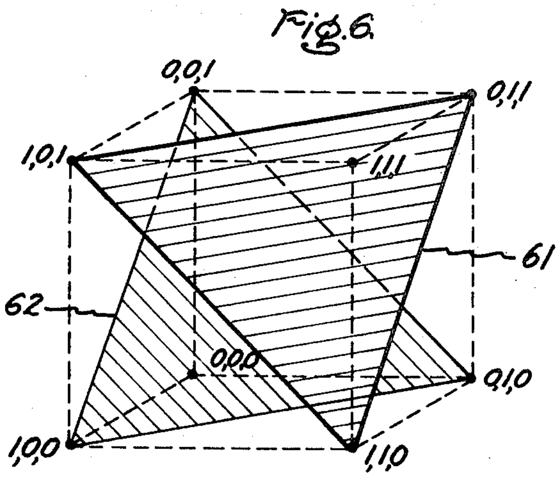
FIG. 6 illustrates the concept of Hamming space.

The concept of separation concerns what is known as Hamming space as illustrated in FIG. 6 wherein the separation between the points 0, 0, 0 and 1, 1, 1 is shown. Hamming space is an *n*-dimensional space in which each location is defined by a series of bits, for example, 0, 0, 0 and 1, 1, 1. In order to transmit either a 1 or a 0 and to be able to tolerate one error in the transmission, it is necessary to transmit three bits of information designating either a one or a zero. In the particular example of FIG. 6, simply repeating the information three times will enable one to transmit either a zero or a one and to tolerate one error.

This can be seen from FIG. 6 in which, for example, the three possible errors that can be made in transmitting the message 1, 1, 1 are interconnected so as to form a plane dividing the interior of the cube defined by the eight possible messages. Similarly, the three possible errors that can be made in transmitting 0, 0, 0 are interconnected to form a plane further dividing the cube formed by the eight possible messages. As can be seen from FIG. 6, these two planes subdivide the cube, are parallel, and are slightly spaced apart. Thus, it can be said that the messages 0, 0, 0 and 1, 1, 1 differ from each other by greater than one in Hamming space. This enables one to transmit either a zero or a one with a tolerable error of one bit.

FIG. 6 while illustrating separation in Hamming space quite well is perhaps the poorest example that could be chosen since there might be construed to be an implication that the number of bits required to tolerate a given number of errors is approximately three times the number of bits of information that are to be transmitted. It turns out however that the example illustrated in FIG. 6 is a "worst case" condition in that to transmit either a one or a zero alone and tolerate one error requires the greatest possible number of redundant bits. It can be shown that for messages of greater and greater bit lengths the number of redundant bits that must also be supplied decreases to the point where, for an infinitely long message, a vanishing fraction of further bits must be added in order to tolerate, for example, one error.

The number of errors in transmission that can be tolerated is determined by the separation in Hamming space of the two points. Again, referring to FIG. 6, in order to tolerate one error in the message it was necessary to utilize a Hamming separation of three. As pointed out above, however, this is a worst case example and the relative Hamming separation necessary to distinguish two points with a given number of errors decreases as the number of bits defining the point increases.

Figure 5:
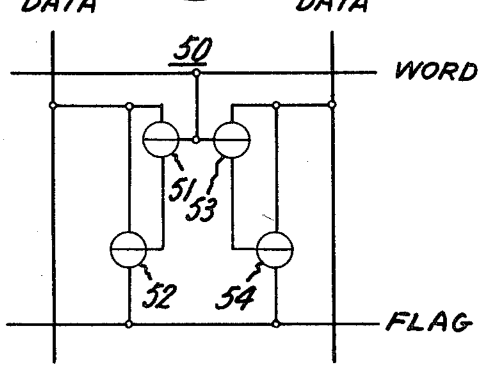
FIG. 5 illustrates an example of an associative memory cell that may be used in the matrix in accordance with the present invention.

FIG. 5 illustrates one example of an associative memory cell suitable for use in the present invention. Typically, an associative memory cell usable in the present invention must be capable of associative search and associative search with mask. An associative search entails applying input information to the memory cell and obtaining from the memory cell an indication of whether or not the applied information matches the information stored in the memory cell.

An associative search with mask requires that the cell be capable of being rendered inactive during a search of a plurality of cells on the same output line. Examples of memory cells suitable for use in the present invention are contained in application Ser. No. 60,336, filed Aug. 3, 1970, and application Ser. No. 146,967, filed May 26, 1971, of common as assignee as the instant application, the entire disclosures of which are incorporated herein by reference thereto. FIG. 5 is similar to the memory cells described in application Ser. No. 60,336.

Specifically, FIG. 5 illustrates an associative memory cell 50 comprising four transistors 51 through 54 interconnecting WORD, FLAG, DATA and DATA lines. Specifically, transistors 51 and 52 have their drains connected to the DATA line. The gates of transistors 51 and 53 are connected to the WORD line and the source of transistor 51 is connected to the gate of transistor 52. The source of transistor 52 is connected to the FLAG line. The drains of transistors 53 and 54 are connected to the DATA line. The source of transistor 53 is connected to the gate of transistor 54. The source of transistor 54 is connected to the FLAG line. There is thus formed by this configuration a pair of storage nodes comprising the capacitances associated with the gates of transistors 52 and 54. The storage of charge in either of these nodes is determinative of whether a logic one or a logic zero is stored in memory cell 50.

To write in memory cell 50, the information to be stored is applied to the DATA and DATA lines and a pulse is applied to the WORD line. For example, if a logic one is to be stored, the pulse on the WORD line turns on transistor 51 which couples charge from the DATA line to the storage node formed by the gate of transistor 52. If a logic 0 were to be stored, DATA line is raised in potential and the pulse on the word line turns on transistor 53 so as to couple charge to the gate of transistor 54. During the writing operation, the line not having charge serves to discharge the storage node associated therewith, thereby acting to eliminate any charge that may have accumulated on the gate that is not to store charge.

During the read operation, the FLAG line is raised in potential and the DATA and DATA lines are monitored to determine upon which of these lines an output is obtained. The line bearing an output is indicative of the state of the storage cell. That is, an output on the DATA line indicates a logic 1 has been stored and an output on the DATA line indicates that a logic 0 has been stored.

The associative search operation is carried out by applying the inverse of the searched data to the DATA and DATA lines. Thus, for example, if a logic 1 is stored in memory cell 50, the DATA line is maintained at a reference potential and the DATA line is raised in potential. Since transistor 54 is in an off condition, there is no path interconnecting the DATA line and the FLAG line. If, however, a logic 1 is stored and a logic 0 is being searched, then the DATA line is raised in potential and a conductive path exists between the DATA line and the FLAG line through transistor 52. This provides an output on the FLAG line indicating that a mismatch has occurred between the search information and the information stored in memory cell 50.

Another characteristic of memory cell 50 is the ability to participate in an associative search with mask. The mask operation entails holding both DATA and DATA lines at a reference potential while pulsing the WORD line. The pulse on the WORD line turns on transistors 51 and 53 and discharges any charge that may have accumulated on the gates of transistors 52 and 54. Thus, no charge at all is stored in memory cell 50. During an associative search, it does not matter what information is applied to the DATA and DATA lines since both transistors 52 and 54 are in an off condition no charge can be coupled to the FLAG line and thus no mismatch can be indicated.

Conversely, in a "don't care" mode of associative search both the DATA and DATA lines are permitted to float during the search. Under these conditions it does not matter what information is stored in memory cell 50 since the memory cell will not contribute mismatch information.

Figure 7:
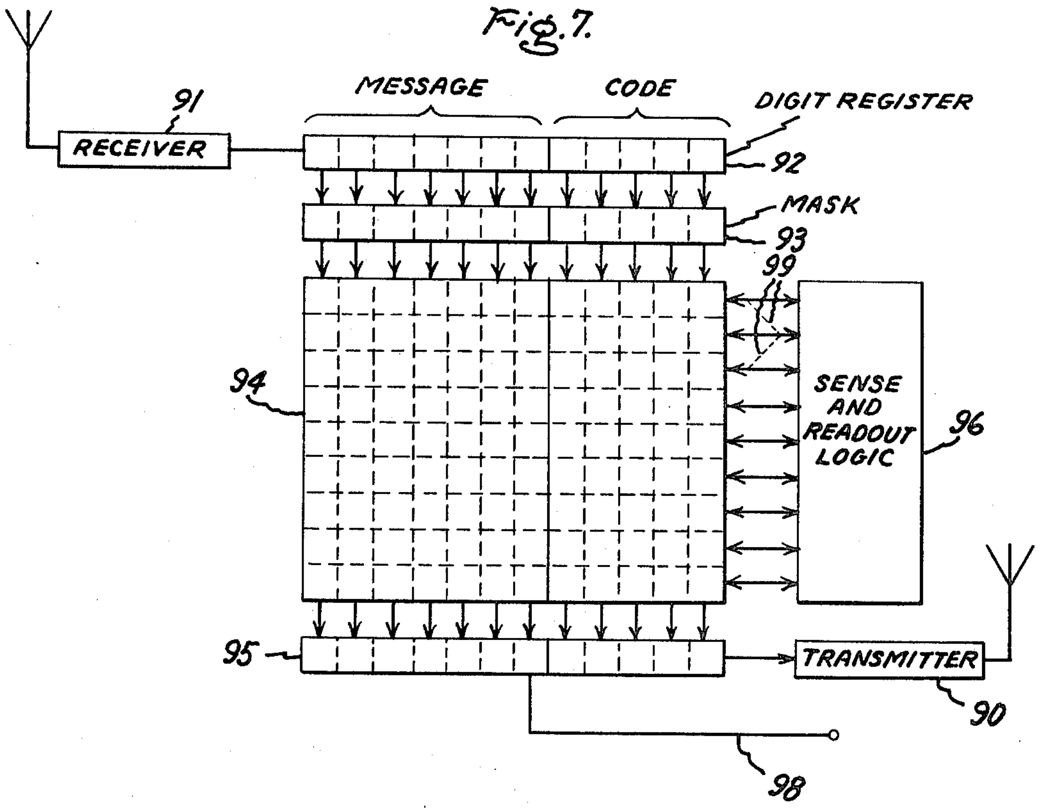
FIG. 7 illustrates a complete associative memory system in accordance with the present invention.

FIG. 7 illustrates a preferred embodiment of the present invention having specific utility as an encoding/decoding mechanism. It should be understood that the utilization of the present invention as an encoder/decoder is but a specific application of the grouping capabilities of the associative memory system. For example, the templates with which the incoming messages are compared are not normally generated in the fashion described in connection with FIGS. 1–4 but rather are manually entered and stored within the associative memory. Each template then represents, rather than the concept of a number of groups of events, the correct form of the message and the region surrounding the concept corresponds to the maximum allowable error that can be tolerated by the system. Thus, in FIG. 1, groups 10–12 represent three messages that can be received wherein the correct form of the message is designated by the + sign. The region surrounding each + sign represents the distance in space in which messages can occur and will be interpreted properly as belonging to the particular correct message. The output current on the FLAG line of a given word is proportional to this distance. Adjustable threshold sensing in accordance with the present invention determines the magnitude of this distance up to the maximum allowed by the code utilized.

Codes that are generated for use in transmitting messages are so designed as to incorporate a maximum amount of separation between any given word and the remaining words so that the distance separating the words in Hamming space is a maximum. Further, the code is so designed that a received message corresponding to event 13 will be decoded as not belonging to any particular group but rather as representing a transmission with errors greater than the number tolerated or else the transmission of a blank character. For example, 5 bits corresponds to 32 possible combinations. There are only 26 letters in the alphabet so that there are six blank combinations. These can either be left as blank characters or utilized for such designations as "space" and various grammatical symbols. The interpretation of an event as a blank character corresponds to the finding of event 13 as belonging to a fourth group, as noted previously.

It should be noted that an encoder/decoder in accordance with the present invention utilizes the minimum number of redundant bits to separate the particular words in Hamming space. That is to say, it requires more redundant bits in order to correct the error than it does to know simply that an error exists in one of the bits. Continuing the example above, to transmit the 26 letters of the alphabet five bits are necessary. In order to be able to correct one error that may occur in transmission of these five bits, it is necessary to actually transmit an eight bit message.

Specifically, in FIG. 7, receiver 91, which may comprise any suitable receiving mechanism producing at its output the logic ones and zeroes of the message to be received, is coupled to digit register 92 which stores each word in the message for searching in associative memory matrix 94. Digit register 92 may comprise any suitable storage mechanism such as associative memory cells or a shift register. Interconnecting digit register 92 and the associative memory matrix 94 is mask means 93 which serves to mask selected bits of the word stored in register 92 and prevent their participation in the search in matrix 94. Connected to the output of each word is a sense and readout logic circuit 96 whose function will be more fully described below. Connected to each column of bits is storage register 95 which stores the information read out from matrix 94. One output of storage register 95 is connected to transmitter 90 for transmitting a coded message back over a transmission link to another station. Another output of register 95 is connected to line 98 from which the uncoded version of a message may be readout.

For the sake of illustrating the preferred embodiment of the present invention, it has been assumed that the coded version of the word comprises a number of bits added on to the uncoded version of the word. A variety of coding schemes are available in which, for example, the coded version may comprise a completely different word or one in which the bits of the uncoded word and the redundant bits are mixed together in a predetermined fashion. The present invention is operative with any coding scheme, the one illustrated is chosen since it is considered more readily visualized than any of the others.

Considering the operation of FIG. 7, the apparatus will be assumed to be in a receiving mode in which it will be necessary to decode a 12 bit word of which the first 7 bits comprise the uncoded version of the word and the remaining five bits are check bits or redundant bits which serve to separate each word in Hamming space from each of the other words being transmitted. As the word is received it is read into digit register 92. After the complete word has been received an associative search is made for the word in associative memory matrix 94. Mask means 93 during this time does not mask any of the bits of the received word.

Each word in matrix 94 is coupled to its own FLAG line and produces thereon an output signal having an amplitude proportional to the number of mismatches between the received word and the words stored in the matrix, and, hence, proportional to the Hamming distance separating the received message and its proper form. The FLAG lines are coupled one each to sense and readout logic circuit 96.

Sense and readout logic 96 detects the word having a number of mismatches less than a predetermined maximum. When this determination is made an output is generated and coupled back to matrix 94 to cause the readout of the most nearly matching word and blocking the readout of the remaining words in the matrix. During this readout, only the uncoded version of the word is read out and stored in storage register 95. This word is then obtained from output 98. Alternatively, the entire word could be read out and stored in register 95. The last five bits would then simply be ignored.

To encode a message for transmission from transmitter 90 to a remote station, the uncoded version of the word to be transmitted is read into digit register 92 as the first seven bits thereof. Mask means 93 is then set to mask the remaining 5 bits. An associative search is made in matrix 94 for the word exactly matching the word stored in digit register 92. When this word is sensed the sense and readout logic circuit 96 causes the entire word contained in matrix 94 to be read out into storage register 95. This then produces the coded version of the word in register 95 which can then be transmitted by way of transmitter 90 to a remote location.

Thus, it can be seen that the apparatus of the present invention provides a mechanism whereby a received message may contain up to a predetermined number of errors and still be properly decoded. Further, the uncoded word can be obtained free of errors quite readily without the need for complex error correction circuitry or "look-up" tables. Similarly, a coded version of an input word can be readily obtained from the identical apparatus.

It may be noted in comparing FIG. 5 and the interconnection between matrix 94 and logic circuit 96 of FIG. 7 that only one output line is indicated interconnecting each word in matrix 94 and the sense and logic readout circuit 96. This may be accomplished in a variety of ways, as for example by the relatively simple combining circuit illustrated in FIG. 8.

Figure 8:
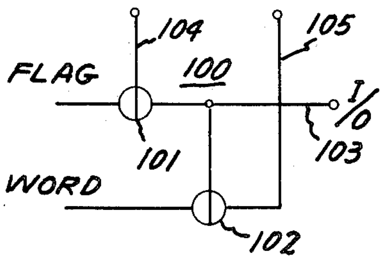
FIG. 8 illustrates an example of an element that may be used in the matrix of FIG. 9.

In FIG. 8, the WORD and FLAG lines from each word in matrix 94 are combined by transistors 101 and 102 so that a single input/output line 103 can be utilized for access to the words in the matrix. For example, during the monitoring of the FLAG line for an indication of the number of mismatches between the searched word and the word associated with that FLAG line, line 104 connected to the gate of transistor 101 is raised in potential thereby coupling the FLAG line to input/output line 103.

Similarly, during the read operation, the gate of transistor 101 is raised in potential so that pulses may be coupled through input/output line 103 to the FLAG line to cause all of the memory cells connected to that FLAG line to be read out. Lines 104 and 105 are connected in common to all of the words in matrix 94. To write in a particular word, for example, line 105 is raised in potential and the selection of which word is written is obtained from input/output line 103. A pulse on input/output line 103 turns on transistor 102 thereby coupling the pulse from line 105 to the WORD line of a particular word in matrix 94.

Figure 9:
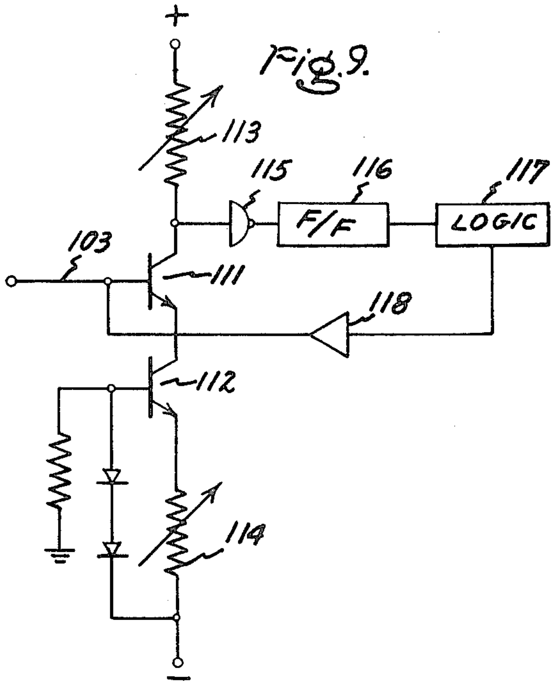
FIG. 9 illustrates an element that may be used in the sense and readout circuit of FIG. 9.

FIG. 9 illustrates one example of sense and readout logic circuitry that may be used in block 96 of FIG. 7. The sense and readout logic circuitry essentially performs two functions. The first is to detect the proper word within a predetermined number of mismatches. The second is to cause the proper word to be read out into storage register 95.

The circuitry of FIG. 9 is used in conjunction with each word of matrix 94. The sense logic is such that once a word has been chosen as the closest match it is the only word that can be so chosen due to the separation in Hamming space of the coded words from one another. That is to say, the output on the FLAG line associated with each word in matrix 94 is proportional to the distance in Hamming space between that particular word and the searched word. If this distance is within a predetermined maximum, an output will be obtained from only one of the sense and readout logic circuits contained within block 94. The remaining sense and readout logic circuits will not be activated because the distance represented by the amplitude of the signal on the FLAG line is greater than the maximum for which they are set.

Specifically, sense and readout logic circuit 96 comprises a pair of transistors 111 and 112 having their emitter-collector paths series connected between a source of operating potentials. In series with the emitter collector paths of transistors 111 and 112 are adjustable current limiting resistors 113 and 114. Connected to the collector of transistor 111 is transistor-transistor-logic (TTL) circuit 115. Connected to the output of TTL circuit 115 is flip-flop 116. Connected to the output of flip-flop 116 is logic circuit 117. Connected to the output of logic circuits 117 is driver 118 which in turn has its output connected to input/output line 103. Input/output line 103 is also connected to the base of transistor 111. Connected to the base of transistor 112 are appropriate bias regulating means.

The overall operation of the sense and logic readout circuit of FIG. 9 is as follows. The number of mismatches that can be tolerated is set by adjusting resistors 113 and 114 to adjust the relative potential across transistors 111 and 112. This varies the input level that must be reached before 115 is activated so as to change state. TTL logic circuit 115 has the characteristic that the output voltage remains high until the input voltage exceeds a predetermined amount. Thus, by adjusting resistors 113 and 114 it can be seen that the number of mismatches that will be tolerated can be adjusted since the input voltage to TTL logic circuit 115 will be varied in accordance with the setting of these resistors.

Flip-flop circuit 116 serves to provide the sense and readout logic circuit with a memory so that the change of state of TTL logic circuit 115, if any, is stored therein. Upon the change of state by TTL logic circuit 115 flip-flop circuit 116 changes state and remains in the new state until such time as the information is no longer needed. Logic circuit 117 senses the change of state and puts out a pulse to operational amplifier 118 which is then amplified and returned to input/output line 103.

The return pulse, combined with a signal on line 104, serves to cause the word that most closely matches the searched word to be readout into storage register 95. It should be apparent that since only one of the sense and logic readout circuits is so activated, the remaining input/output lines interconnecting matrix 94 and circuit 95 are not activated and that therefore only the proper word is read out. The circuitry of FIG. 9 is exemplary only and should not be construed as the only mechanism whereby these various functions may be carried out.

Also illustrated in FIG. 7 are two additional lines 99 which serve to connect together the input/output lines of three words. In so doing, one can then require that the searched word match the three words so interconnected in matrix 94 within the same predetermined maximum number of mismatches. This capability is useful for forming more complicated templates describing disjunctive regions in Hamming space.

Figure 10:
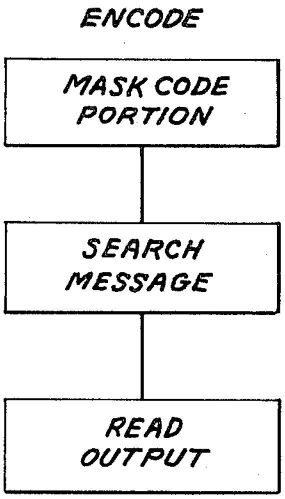
FIG. 10 illustrates the coding steps in accordance with the present invention.

FIG. 10 illustrates the procedure followed in encoding information. Specifically, the coded storage portion of the matrix is masked while an associative search is made of the message. After a match has been found, the entire word in the matrix, corresponding to the coded version, is read out.

Figure 11:
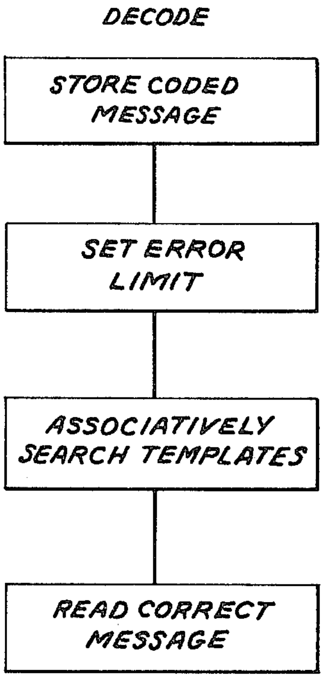
FIG. 11 illustrates the decoding steps in accordance with the present invention.

As illustrated in FIG. 11, to decode a input word, the input word is stored, the error limit in circuit 96 is set to a predetermined value, and an associative search is made of matrix 94 for the most nearly matching word stored therein. This word is then read out either in its entirety or only the portion corresponding to the uncoded word.

Having thus described the invention, it will be apparent to those skilled in the art that various modifications can be made without departing from the spirit and scope of the present invention. For example, in FIG. 2 in the template fabrication stage, one could, if so desired, retain all of the information about each group in fabricating the templates. Thus, a system such as illustrated in FIG. 7 may comprise a matrix 94 of the templates formed as described in connection with FIG. 2 but with the information concerning each event retained in a memory extending in a direction perpendicular to the plane of the figure. In this way, with the information about each event in the group retained, as new events are incorporated into a particular group, the template defining the concept of the group can be updated and refined periodically. Further, although FIG. 7 illustrates a receiver as the source of words, any source may be utilized. For example, a camera tube can be read out, with each reading forming one word, each image an event. Also, as noted above, any coding plan may be used. For example, where the coded version is not derived from the uncoded word, the first $n_i$ bits of a word in the matrix would correspond to the uncoded word while the remaining $n_j$ bits correspond to the coded word.

What I claim as new and desire to secure by Letters Patent of the United States is:

1. An associative memory system comprising:

a matrix of associative memory cells interconnected in columns of bits and rows of words, wherein each cell produces an output signal at a first or a second level depending upon whether or not applied information matches the information stored in the cell and wherein each cell in a row is connected to a common output line to produce a multilevel signal proportional to the number of cells on said output line in which the applied information matches said stored information;

input means for applying an unclassified word to all of the columns in said matrix simultaneously;

mask means interconnecting said input means and said columns for masking selected bits of said unclassified word; and variable threshold sensing means connected to said common output lines for detecting which of the words in said matrix matches said unclassified word within a predetermined number of allowable mismatches.

2. An associative memory system as set forth in claim 1 and further comprising:

readout means coupled to said variable threshold sensing means for causing only the most nearly matching word to be read out.

3. An associative memory system as set forth in claim 2 wherein said readout means causes the entire most nearly matching word to be read out.

4. Apparatus for grouping events in $n$-dimensional space wherein each event is represented by a $n$-bit word comprising:

a $m$ plurality of $n$-bit word templates interconnected in a $m \times n$ matrix, each template representing the concept of a particular group;

each template comprising $n$ associative memory cells, wherein each cell produces an output signal at a first or a second level depending upon whether or not applied information matches the information stored in the cell and wherein each cell in a template is connected to a common output line to produce a multilevel signal proportional to the distance in $n$-dimensional space between the concept represented by the template and an event;

input means for applying the word representing an unclassified event to said matrix; and adjustable threshold sensing means coupled to the output line of each template, said adjustable threshold sensing means detecting, within a predetermined range, the concept closest said unclassified event as represented by a minimum number of mismatches.

5. Apparatus for grouping events in $n$ dimensional space as set forth in claim 4 wherein at least one template contains at least one masked bit.

6. Apparatus for grouping events in $n$-dimensional space as set forth in claim 4 wherein said adjustable threshold sensing means comprises $m$ threshold sensors coupled one each to said templates for detecting within the space defined by the concept and said predetermined range the proximity of an unclassified event to the concept represented by each template, said threshold sensors being adjustable between zero distance and the outermost boundary of each group.

7. Apparatus for grouping events in n dimensional space as set forth in claim 6 wherein at least one template contains at least one masked bit for generalizing the concept defined by the template.

8. Encoding and decoding apparatus comprising:

a matrix of associative memory cells interconnected in columns of bits and rows of words, each row of cells containing the coded and decoded versions of message words, each cell producing an output signal at a first or a second level depending upon whether or not an applied bit matches the bit contained in the cell and wherein each cell in a row is connected to a common output line to produce a multilevel output signal proportional to the number of mismatched bits on that output line;

input means for applying an input word to said entire matrix simultaneously;

mask means, interconnecting said input means and said columns, for masking selected bits of said input word during encoding and not masking any bits during decoding;

adjustable threshold sensing means connected to said rows for enabling said encoding and decoding apparatus to accept a predetermined number of errors, said adjustable threshold sensing means detecting the word in said matrix matching said input word within a predetermined number of bits; and readout means coupled to said adjustable threshold sensing means for causing only the word in said matrix matching within said predetermined number of bits to be read out in its entirety during encoding, and for causing only the uncoded portion of the word matching within said predetermined number of bits to be read out during decoding.

9. Encoding and decoding apparatus as set forth in claim 8 wherein said sensing means comprises a plurality of adjustable threshold sensors coupled one each to each word in the matrix, said threshold sensors being adjustable between a zero error state and a predetermined maximum error tolerance state.

10. Encoding and decoding apparatus as set forth in claim 8 wherein at least one cell in at least one word stores blank information for preventing that bit from contributing to said multilevel signal regardless of the setting of said mask means.

* * * * *